United States Patent [19]

Freedman

[11] Patent Number: 4,843,532
[45] Date of Patent: Jun. 27, 1989

[54] REGULATING PULSE WIDTH MODULATOR FOR POWER SUPPLY WITH HIGH SPEED SHUTOFF

[75] Inventor: David D. Freedman, Cinnaminson, N.J.

[73] Assignee: General Electric Company, Moorestown, N.J.

[21] Appl. No.: 213,954

[22] Filed: Jul. 1, 1988

[51] Int. Cl.[4] .......................................... H02M 3/335
[52] U.S. Cl. ....................................... 363/26; 363/17; 363/56
[58] Field of Search ...................... 363/24, 25, 26, 41, 363/56, 97, 17

[56] References Cited

U.S. PATENT DOCUMENTS

| | | | |
|---|---|---|---|
| 3,930,194 | 12/1975 | Walker | 363/56 |
| 4,186,330 | 1/1980 | Bohringer | 315/411 |
| 4,266,268 | 5/1981 | Tkacenko | 363/97 X |
| 4,293,902 | 10/1981 | White | 363/26 |
| 4,480,297 | 10/1984 | Chetty et al. | 363/26 |
| 4,484,256 | 11/1984 | Hartman | 363/26 |
| 4,691,270 | 9/1987 | Pruitt | 363/56 |
| 4,761,722 | 8/1988 | Pruitt | 363/17 |

OTHER PUBLICATIONS

Silicon General Application Note SG1524, pp. 80–86.
Silicon General Application Note SG1524B, pp. 272–278.

Primary Examiner—William H. Beha, Jr.
Assistant Examiner—Kristine Peckman
Attorney, Agent, or Firm—Clement A. Berard, Jr.; William H. Meise

[57] ABSTRACT

A switching power supply includes push-pull power switches driven by first and second conjunction gates. The conjunction gates are coupled to receive the output of a flip-flop, together with the antiphase outputs of a binary divider which divides down the output of the flip-flop. The flip-flop is driven recurrently by sync to enable one of the conjunction gates, and the binary divider steers the enablement alternately. When the output voltage or current crosses the design threshold, a comparator is triggered to produce a shut-down signal which is applied to the reset input terminal of the flip-flop to reset it. Delay in the flip-flop is avoided by also applying the shut-down signal to the conjunction gates. The maximum possible duty cycle is extended by initiating switch conduction at a predetermined short time after initiation of the sync pulse.

5 Claims, 5 Drawing Sheets

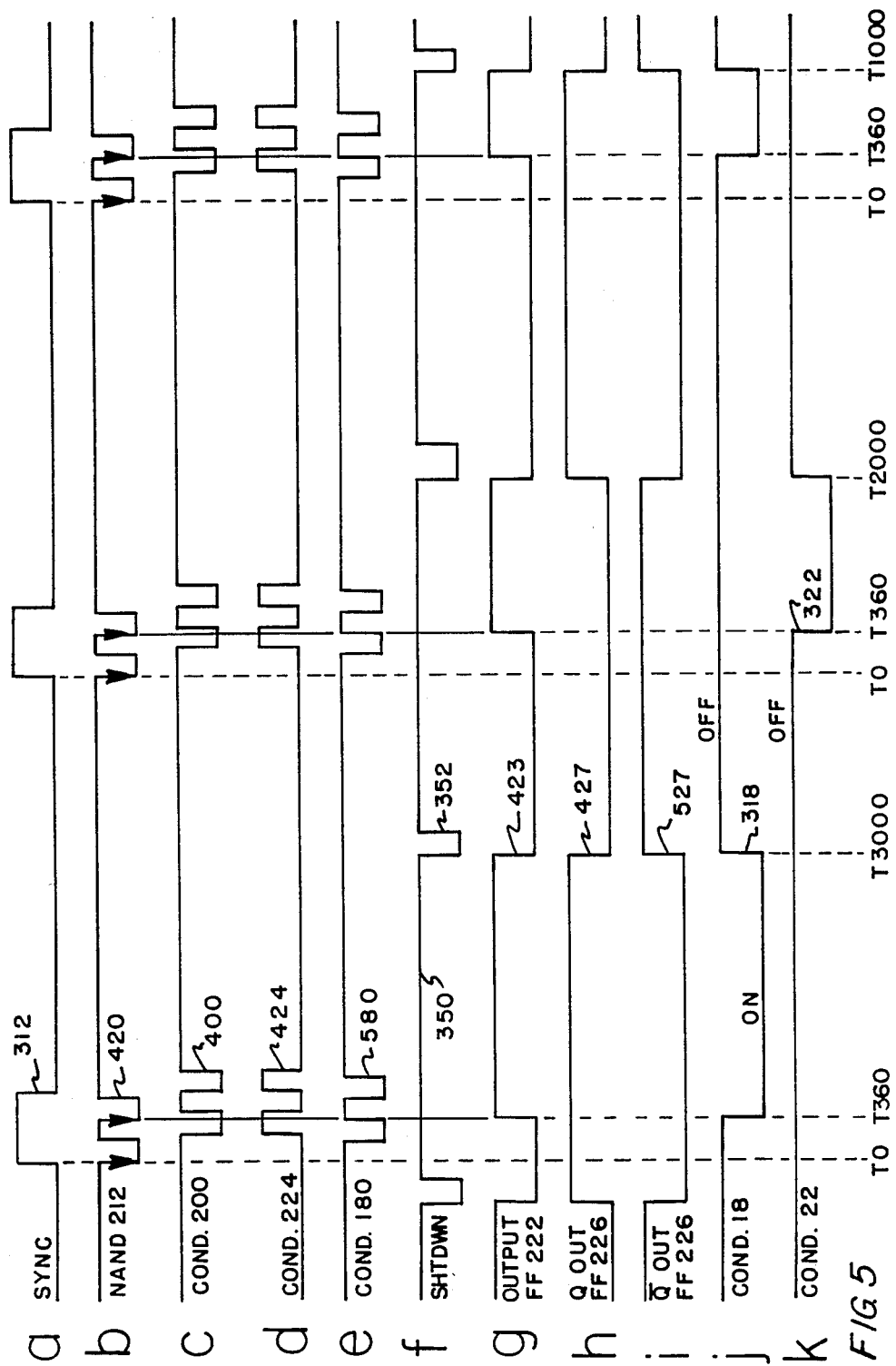

REGULATING PULSE WIDTH MODULATOR FOR POWER SUPPLY WITH HIGH SPEED SHUTOFF

The Government has rights in this invention pursuant to contract No. N00024-81-C-5106 with the Department of the Navy.

The invention relates to switching power supplies including pulse width modulators in which the shutdown circuit has minimized delay, and the turn-on has maximized duty cycle.

Some power supplies are used to convert alternating current (AC) or direct current (DC) power into regulated direct voltage. Ordinarily, the input to the power supply is unregulated line alternating current as received from the power mains, or possibly unregulated (raw) direct voltage. Ordinarily, the output is a regulated direct voltage subject to changing or dynamic load conditions. Historically, power supplies include rectifiers, filters and either series or parallel-connected electronic circuits for regulation. Earlier power supply regulators operated in a linear mode, using active devices such as vacuum tubes or transistors as variable resistances, but such regulators had low efficiency due to the power dissipation in the power regulating active device. Modern power supply regulators achieve increased efficiency by the use of switched regulator regulating systems, in which the duty cycle or pulse width of a switch or switches is controlled in order to achieve output regulation. Such switch regulators achieve increased efficiency in part because the active device takes on either a conductive (ON) or nonconductive (OFF) condition, with minimized intervals in which linear operation occurs.

A power supply receiving its input power from the alternating current mains may include rectifiers connected to the mains for rectifying the alternating current thereon to produce raw direct current. If the mains supply direct rather than alternating current or voltage, the rectifiers simply pass direct current to the following circuits with only a slight loss. The raw direct current is applied to a controllable switch which is ordinarily a transistor, which is cycled between conductive and nonconductive conditions at a relative high rate, such as 10 or 100 KHz. The ratio of the conductive time to the nonconductive time of the controllable switch is modulated or controlled in response to signals from a control circuit in order to stabilize a parameter of output power, such as voltage or current. During the conductive periods of the controllable switch, raw direct current flows through the switch and through a primary winding of a power transformer. During nonconductive periods, the direct current applied to the primary winding of the transformer ceases. Pulses recur at the switch operating rate. The current or voltage pulses produced in the secondary winding are rectified and filtered to produce the desired direct output voltage or current.

Regulation of the output parameter such as direct voltage is achieved by comparing the output voltage with a stable reference voltage. Results of the comparison are used to control the ratio of the conductive intervals of the controllable switch to the nonconductive intervals.

In many pulse width modulated control circuits, the output parameter (voltage or current) makes excursions above and below the desired set-point or regulated value during each cycle of operation of the controllable switch. For example, the controllable switch is turned ON (rendered conductive) during each cycle, and turned OFF (rendered nonconductive) when the output voltage rises somewhat above the set-point. If close regulation of the output parameter is desired, not only must the individual turn-OFF levels be close to the desired regulation value, but also the delay between the occurrence of the excursion above the set-point and the resulting turn-OFF of the controllable switch must be small. A large delay between the initial command to operate the switch and the resulting switch operation could damage circuitry in the event of a fault condition. A switched power supply with short turn-OFF interval or delay is desired.

SUMMARY OF THE INVENTION

A pulse width modulator (PWM) is adapted for driving a switching power supply which includes first and second controllable power switches, each of which includes a control input terminal. Each power switch is adapted to be coupled to a source of power for switching the power to produce a direct output voltage. The PWM includes a first conjunction gate with an output terminal adapted to be coupled to the control input terminal of the first controllable switch, and also includes first, second and third input terminals. A second conjunction gate also includes an output terminal adapted to be coupled to the control input terminal of the second controllable switch. The second conjunction gate also includes first, second and third input terminals. A binary divider includes an input terminal adapted to receive signal to be frequency divided and also includes first and second mutually antiphase output terminals. The first output terminal of the binary divider is coupled to the first input terminal of the first conjunction gate. The second output terminal of the binary divider is coupled to the first input terminal of the second conjunction gate. The binary divider alternately assumes first and second operating states in response to its input signal for alternately enabling the first input terminals of the first and second conjunction gates. A controllable flip-flop includes J,K, clock and reset input terminals, and also includes an output terminal coupled to the input terminal of the binary divider. The output terminal of the controllable flip-flop is also coupled to the second input terminals of the first and second conjunction gates. The controllable flip-flop assumes a first state only in response to a transition of a first polarity at its clock input terminal under a condition in which its J input terminal is at a first of two logic levels and its K input terminal is at a second logic level. The controllable flip-flop assumes it second state under two conditions, (a) in response to a transition of the first polarity at its clock input terminal when the J input terminal is at the second logic level and the K input terminal is at the first logic level and (b) upon application of a reset signal to the reset input terminal. In the first state of the controllable flip-flop, the second input terminals of the first and second conjunction gates are enabled, and in the second state of the controllable flip-flop the second input terminals of the first and second conjunction gates are disabled. A gated oscillator includes a gating input terminal adapted to be coupled for receiving a synchronizing signal recurring at the desired recurrence rate of the power supply. The gated oscillator also includes an undelayed output terminal coupled to the clock input terminal of the controllable flip-flop, and further includes mutually antiphase first and second delayed output terminals. The first delayed output terminal is coupled to the J input terminal of the controllable flip-flop. The second delayed output terminal of the gated oscillator is coupled to the K input terminal of the controllable flip-flop. The oscillator self-oscillates at a frequency such that at least one and one-half complete operating cycles occurs during each gating interval of the synchronizing signal. Each complete cycle of oscillation of the gated oscillator includes a first operating state preceded by a first transition of a first polarity and a second operating state preceded by a second transition of a second polarity. The first delayed output terminal of the gated oscillator is at a second logic level and the second delayed output terminal is at a first logic level immediately after the first transition of each gating interval at the undelayed output terminal, which causes the controllable flip-flop to assume its second operating state for disabling both the first and second conjunction gates, and for causing the binary divider to change operating states if the controllable flip-flop changes its operating state in response to the first transition. In response to the second transition of the first cycle at the undelayed output terminal of the gated oscillator, the logic levels at the first and second delayed output terminals of the gated oscillator interchange. Under this condition, the J input terminal of the controllable flip-flop assumes the first logic level, and the K input terminal assumes the second logic level. At the third transition of each gating interval at the undelayed output terminal of the gated oscillator, the controllable flip-flop assumes the first operating state, which enables the second input terminals of the conjunction gates. The shut-down signal is applied to the reset input terminal of the controllable flip-flop. The reset input terminal is directly connected by a conductor to the third input terminals of the first and second conjunction gates. A shut-down signal is generated by comparison of the power supply output voltage with a reference voltage or by over current or a fault. The shut-down signal is normally at the first logic level during the gating interval, to thereby complete the enabling of that one of the first and second conjunction gates which is selected by the binary divider. During the gating interval, one of the controllable switches is enabled to cause an increase in the output voltage. When the output voltage equals or exceeds the reference value, the shut-down signal is applied to disable the conjunction gates directly, and to reset the controllable flip-flop, thereby further guaranteeing shut-off. The conjunction gates in a particular embodiment are NAND gates.

DESCRIPTION OF THE DRAWING

FIGS. 3, 4 and 5 are timing diagrams illustrating voltage and current amplitude-time waveforms associated with the arrangement of FIG. 1 during operation.

DESCRIPTION OF THE INVENTION

Figure 1:
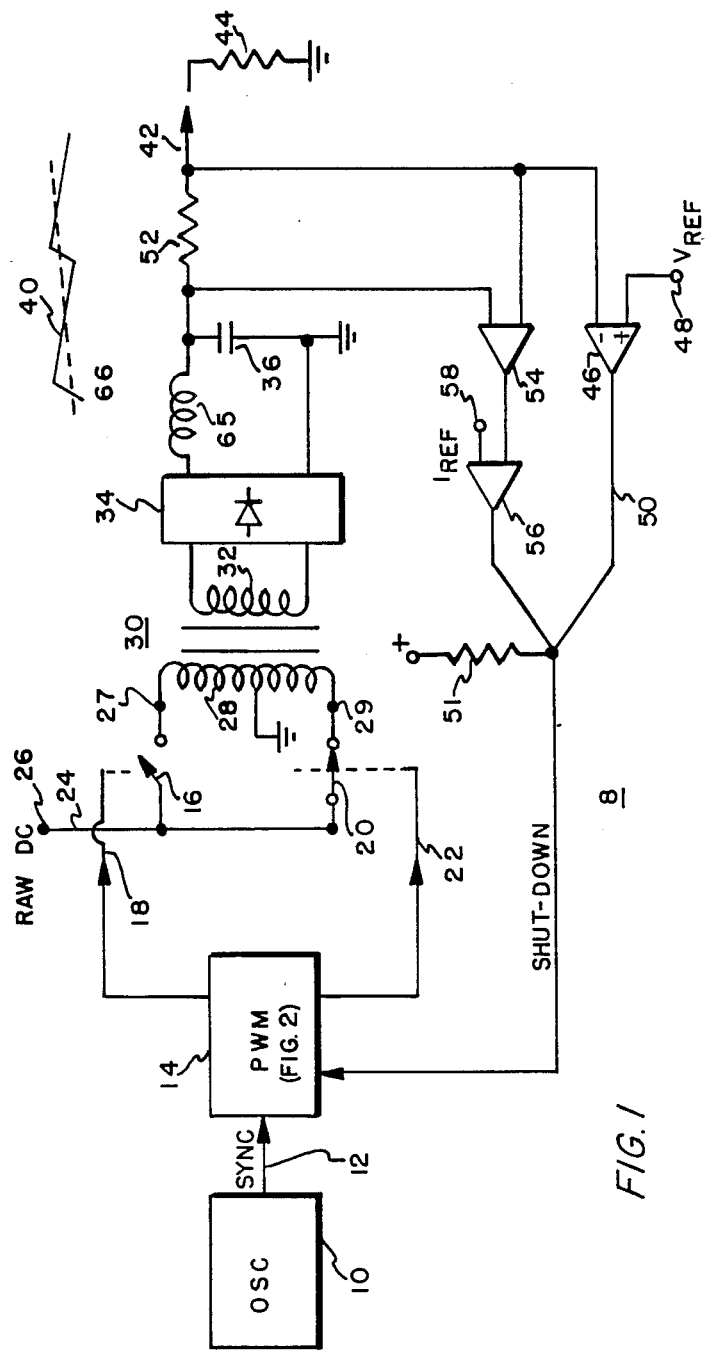
FIG. 1 is a simplified block diagram of a power supply according to the invention.

In FIG. 1, a power supply designated generally as 8 includes an oscillator 10 which produces gating or SYNC signals on a conductor 12 for application to a pulse width modulator (PWM) 14. Pulse width modulator 14 is described below in conjunction with FIG. 2. PWM 14 responds to gating signals from oscillator 10 to control a first power switch 16 by way of a path 18 and, time-alternately, a power switch 20 by way of a path 22.

Switches 16 and 20 are illustrated as mechanical switches, but those skilled in the art know that power bipolar transistors, FETs or other devices may be used. Control paths 18 and 22 may include transistor driver circuits appropriate to the type of power switch 16, 20 being used. Power switches 16 and 20 are connected in common by way of a conductor 24 to a terminal 26 for receiving raw direct voltage (often called DC). The direct voltage from terminal 26 is time-alternately coupled by switches 16 and 20 to alternate ends 27, 29 of a center tapped primary winding 28 of a transformer designated generally as 30. The center tap of primary winding 28 is connected to ground. Primary winding 28 is magnetically coupled to a secondary winding 32 of transformer 30. Secondary winding 32 is coupled to a rectifier arrangement illustrated as a block 34 for rectifying the power induced in secondary winding 32 and for applying the resulting current to a low pass filter 66 including an inductor 65 and a capacitor 36. Capacitor 36 integrates the current to produce a direct voltage upon which is superimposed the sawtooth voltage ripple illustrated as 40 on or across capacitor 36. The voltage across capacitor 36 is made available on an output conductor 42 for application to a load represented as a resistor 44. While the load is illustrated as a resistor, those skilled in the art realize that the load may be variable and reactive. A voltage comparator 46 has an inverting (−) input terminal connected to conductor 42 and a noninverting (+) input terminal connected to a terminal 48 for receiving therefrom a stable reference voltage $V_{ref}$. Comparator 46 compares the output voltage (or divided version of the output voltage if a voltage divider is used) with the reference voltage $V_{REF}$ for producing a bilevel (two-level) shut-down signal on an output conductor 50. If desired, a current sensing arrangement illustrated as a resistor 52 may be coupled in-line or in series with conductor 42. Resistor 52 may be connected to the input terminals of a differential buffer amplifier 54. The output of buffer amplifier 54 is connected to a first input terminal of a further comparator 56, a second input terminal of which is connected to a terminal 58, for receiving from terminal 58 a voltage representative of a limit current. The output of comparator 56 may be coupled to shut-down conductor 50 by the use of an adder circuit or, as illustrated in FIG. 1, by direct connection, if a pull-up resistor 51 is connected to conductor 50 and the output terminals of comparators 46 and 56 are both open-collector. In this context, the term open-collector means that the output impedance of the comparator is high when the comparator is producing a logic high level. Shut-down conductor 50 is connected as a control input to PWM circuit 14.

During each operating cycle of the power supply, one or the other of switches 16, 20 is rendered conductive (turned ON) shortly after the leading edge of each sync pulse, thereby allowing current to flow in one half of primary winding 28 of transformer 30. This causes a current to flow through rectifier block 34 to cause an increase in voltage across capacitor 36. The increase continues until comparator 46 senses that the output voltage on conductor 42 exceeds reference voltage $V_{ref}$. At this time, comparator 46 produces a negative transition to a logic low level, representing shut-down. The shut-down signal is applied over conductor 50 to PWM block 14 to command turn-OFF of that one of the switches 16, 20 which is currently conducting. PWM block 14 then turns the switch to the OFF condition. Both switches 16, 20 remain OFF until the next following sync pulse from oscillator 10. In the time interval between the turn-OFF of the conducting switch and the next following sync pulse which commands a turn-ON, the output voltage decreases as load resistor 44 draws current from capacitor 36, representing the decreasing portion of sawtooth 40. At some time between each turn-OFF of a switch and the next following sync pulse from oscillator 10, voltage sawtooth 40 decreases to a value below reference voltage $V_{REF}$, and comparator 46 switches to its high-impedance condition. At any time during conduction of one of switches 16 or 20, a load current in excess of that represented by the reference voltage at terminal 58 will cause the output of comparator 56 to switch from a high impedance condition to a logic low condition, thereby commanding turn-OFF of that one of switches 16 and 20 which then happens to be conducting, even if the output voltage has not achieved its regulated value.

Figure 2:
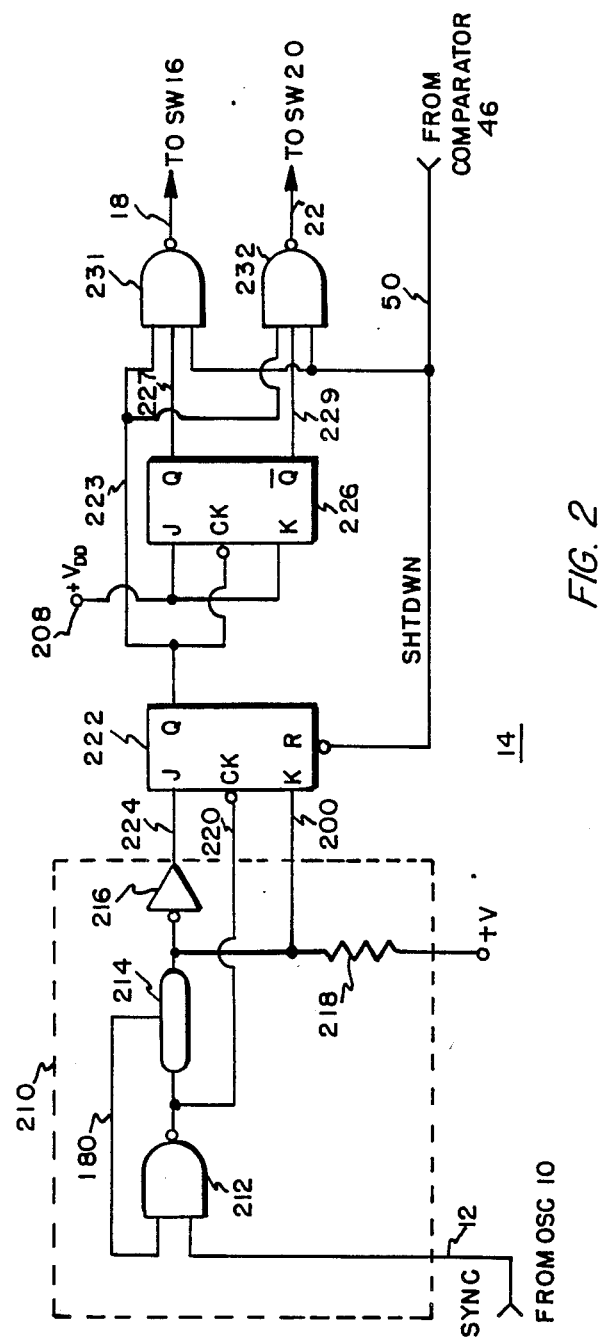
FIG. 2 is a block diagram of a portion of the arrangement of FIG. 1.

FIG. 2 is a logic diagram illustrating details of pulse width modulator circuit 14 in accordance with the invention. In FIG. 2, a gated oscillator designated generally as 210 includes a conjunction gate in the form of a NAND gate 212. A conjunction gate for this purpose is a gate which has a particular output state in response to the conjunction of a particular set of input logic levels, as for example an AND gate or a NAND gate. An input terminal of NAND gate 212 is coupled to conductor 12 for receiving gating signals from oscillator 10. An output of NAND gate 212 is applied to the clock (CK) input 220 of a controllable JK flip-flop (FF) 222, and is also applied to an input terminal of a delay line 214. Delay line 214 includes first and second mutually delayed output terminals. For example, delay line 214 may include a first output on conductor 180 at 180 nanoseconds (nS), and a second output on a conductor 200 at 200 nS. The 180 nS-delayed signal is applied over conductor 180 to a second input of NAND gate 212, thereby forming a delay-line oscillator with an undelayed output of conductor 220. The 200 nS output of delay line 214 is applied over conductor 200 to the K input terminal of JK FF 222. A terminating resistor illustrated as 218 is connected to conductor 200 for preventing delay-line reflections, as known in the art. Gated oscillator 210 also includes an inverter 216 having an input connected to conductor 200 at the 200 nS output of delay-line 214 for producing an inverted delayed output on a conductor 224 for application to the J input terminal of FF 222.

The Q output of FF 222 is applied to the clock (CK) input terminal of JK FF 226 connected as a binary divider. The Q output of FF 222 is also applied by a conductor 223 to first input terminals of NAND gates 231 and 232.

The J and K input terminals of FF 226 are connected to an input terminal 208 to receive $+V_{DD}$ therefrom, representing a logic high level. In the binary divider mode, each negative-going transition of a signal applied to the CK input terminal of FF 226 causes its operating state to change. The Q output of FF 224 is applied to a second input terminal of NAND gate 231, and the Q bar output is applied to a second input terminal of NAND gate 232.

The output terminal of NAND gate 231 is applied by way of conductor 18 and by appropriate drivers, as necessary, to control the operation of power switch 16 (FIG. 1). The output terminal of NAND gate 232 is similarly applied by way of conductor 22 to a control input terminal of power switch 20. The reset (R) input terminal of FF 222 is connected by conductor 50 to third input terminals of NAND gates 231 and 232 and to receive the shut-down signal from comparator 46 (FIG. 1).

Figure 3:
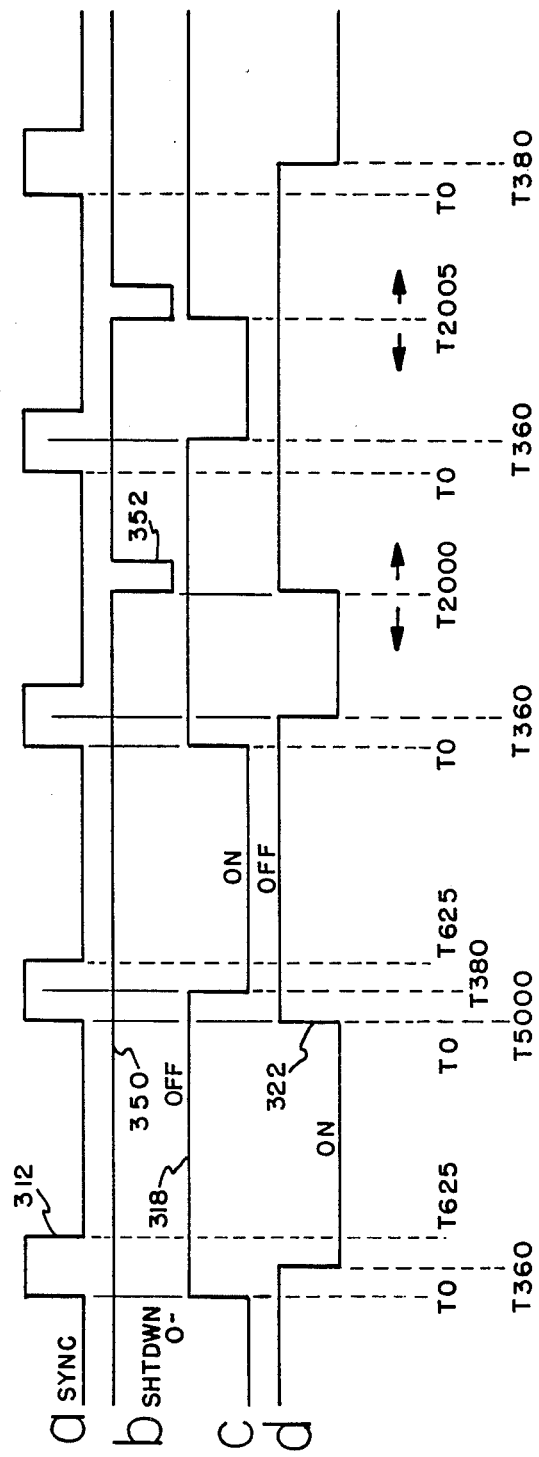

FIGS. 3a–3d illustrate the overall timing of the arrangement of FIGS. 1 and 2. Times in FIG. 3 are designated in nanoseconds (nS). In FIG. 3, synchronizing pulses 312 produced by oscillator 10 (FIG. 1) have positive-going leading edges recurring at times T0 (Tzero) separated by 5000 nS, corresponding to 5 microseconds ($\mu$S). The positive-going portion of each sync pulse 312 has a duration of 625 nS, and so extends from each recurrent time T0 to the following time T625. At initial turn-ON, the output voltage on conductor 42 (FIG. 1) will not reach its design value for several operating cycles, and therefore the shut-down signal applied over conductor 50 from comparator 46, illustrated in FIG. 3b as waveform 350, assumes a logic high state for the first few cycles. FIG. 3c illustrates as a waveform 318 the logic state of the signal produced on conductor 18 of FIG. 1 by PWM 14. As illustrated, waveform 318 makes a transition to a logic high condition (corresponding to an OFF condition of switch 16) at each recurrent time T0 and remains in the logic high condition until a time T360 after the next following time T0. FIG. 3d illustrates as a waveform 322 the logic condition produced on conductor 22 (FIG. 1) by PWM 14. As illustrated in FIG. 3, both waveforms 318 and 322 assume a logic high condition in the interval T0–T360, thereby guaranteeing that power switches 16 and 20 are in their nonconductive state during that interval, and thus preventing a condition in which both switches are ON simultaneously, which might damage the power switches or the transformer.

In FIG. 3, initial turn-ON is represented by the absence of negative-going portions of shut-down waveform 350 in each recurrent interval T0–T0. As illustrated in FIGS. 3c and 3d during initial turn-ON, waveforms 318 and 322 alternately assume their logic low condition, representing conduction of the associated power switch, during the interval T360–T0. This is the longest possible conduction period during each cycle, corresponding to the highest duty cycle. This results in rapid increase in the output direct voltage on conductor 42 (FIG. 1).

At some time following turn-ON, the output voltage produced on conductor 42 will approach its design value, and comparator 46 will produce a negative-going pulse during a portion of each recurrent interval T0–T0. The first such pulse is illustrated in FIG. 3b as portion 352 of waveform 350, which occurs at a time illustrated as time T 2000, but which may vary depending upon exactly when during the cycle the output voltage on conductor 42 (FIG. 1) reaches the desired value). As illustrated in FIGS. 3d, waveform 322 is at a logic low level just before time T 2000, representing an ON condition of switch 20. Waveform 322 makes a transition to a logic high level at time T 2000, representing a commanded turn-OFF of power switch 20 at time T 2000 to thereby tend to prevent further increase in the output voltage. After time T 2000 as illustrated in FIG. 3, each recurrent interval T0–T0 includes a time during which shut-down waveform 350 has a negative-going transition, which shuts off that one of the power switches 16, 20 (FIG. 1) which then happens to be conductive. In this way, regulation of the output voltage is achieved.

Figure 4:
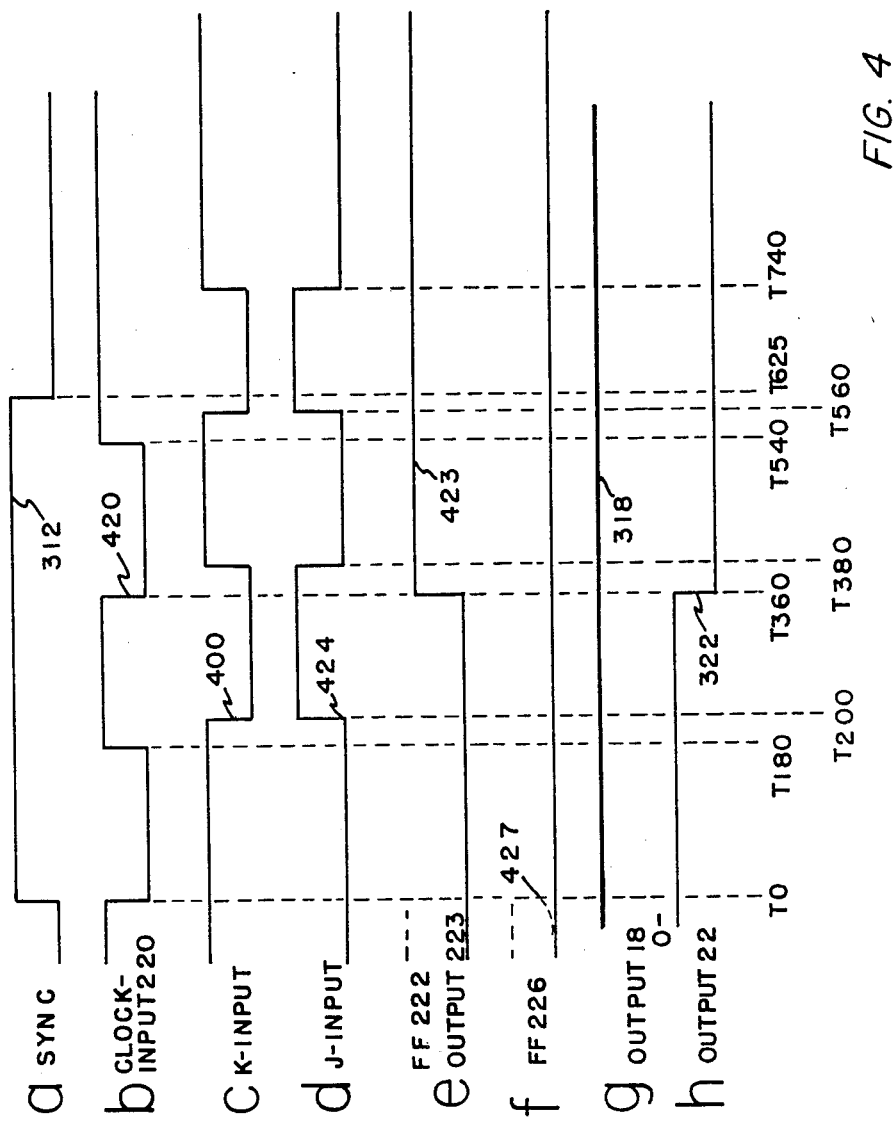

FIG. 4 illustrates in simplified form the timing of signals occurring in the logic circuit of FIG. 2. Waveforms or times illustrated in FIG. 4 corresponding to those illustrated in FIG. 3 are designated by the same numerals. In FIG. 4, waveform 420 of FIG. 4b represents the (undelayed) output of NAND gate 212 on conductor 220 in response to self-oscillation of the start-stop oscillator including NAND gate 212, a portion of delay 214 and conductor 180. At a time T0, the positive-going gating or enabling signal 312 on conductor 12, applied to the lower input terminal of NAND gate 212, causes the negative-going transition on conductor 220, as illustrated by waveform 420. After a delay of 180 nS, the negative-going transition reaches the other, upper input terminal of NAND gate 212 and causes a transition of the output to a logic high level, as illustrated by waveform 420 at time T180. The changes in output state at 180 nanosecond intervals continues for several half-cycles, until gating signal 312 applied over conductor 12 to NAND gate 212 take a logic low level, which as illustrated in FIG. 4 occurs at a time T625, after the third half-cycle of oscillation produced on conductor 220, as illustrated by waveform 420 of FIG. 4b.

About 20 nS after each undelayed transition of oscillator signal on conductor 220, the transition propagating through delay line 214 reaches conductor 200 at the 200 nS delayed output, and produces a transition, as illustrated by waveform 400 of FIG. 4c. The output of inverter 216 on conductor 224 is the inverse of the waveform on conductor 200, as illustrated by waveform 424 of FIG. 4d.

In FIG. 2, JK FF 222 responds to each negative-going transition of waveform 420 of FIG. 4b at its CK input terminal to transfer the logic level then at its J input terminal to the Q output terminal. Referring to FIG. 4b, negative-going transitions at the CK input of FF 222 occur at times T0 and T360. At time T0 the J input is at a logic low level, as illustrated by waveforms 424 of FIG. 4d. Consequently, regardless of the previous state of FF 222, at time T0 it assumes a reset condition in which the Q output is at a low level, as illustrated by waveform 423 of FIG. 4e. The next following negative-going transition at the CK input of FF 222 occurs at the time T 360, as illustrated by waveform 420 of FIG. 4b. At time T 360, the J input terminal of FF 222 is at a logic high level, as illustrated by waveform 424 of FIG. 4d. At time T360, therefore, FF 222 assumes a set condition with its Q output at a logic high level, as illustrated by waveform 423 of FIG. 4e. The duration of waveform 312 is insufficient to permit a further negative-going transition of waveform 420, so FF 222 remains in the set condition with its Q output terminal at a logic high level until either the next following time T0 or until reset by a shut-down signal (352 of FIG. 3b) from comparator 46. Thus, FF 222 becomes set with its Q bar output and conductor 223 at a logic high level beginning at recurrent times T360.

A logic high level on conductor 223 when applied to inputs of NAND gates 231 and 232 enables them. In this context, the term enable means that the gate is not inhibited from changing state in response to changes in input signal applied to other inputs of the logic gate. For clarity, this is termed "enabling the input". Thus, the enabling of NAND gate 231 and 232 by a logic high level at the Q output of FF 222 does not necessarily cause gates 231 and 232 to change state, but merely allows them to change state in response to other inputs. After time T360, therefore, NAND gates 231 and 232 are enabled (although due to FF 226 only one may have a low output), and they both remain enabled until the occurrence of a shut-down signal propagated through FF 222, or until the next following time T0.

Flip-flop 226, as mentioned, is configured as a binary divider, responding to negative-going transitions at its CK input. The input signal applied to the CK terminal of FF 226 is illustrated as waveform 423 of FIG. 4e. No negative-going transitions of waveform 423 are illustrated in the interval T0–T740 illustrated in FIG. 4. As mentioned, however, waveform 423 makes a negative-going transition either in response to the shut-down signal at a later time within the interval T740–T0 or, at the very latest, at the next following time T0. Thus, binary divider 226 changes state either at time T0 as illustrated by phantom lines in waveform 427 of FIG. 4f or before time T0, or as illustrated in FIG. 4f, waveform 427 is at a logic low level through the entire interval T0–T740. However, it could as well have been a logic high level during the entire interval. In general, during normal operation, waveform 427 of FIG. 4f will alternate between logic high and logic low levels in the interval T0–T740 on successive cycles. These represent two alternate states of binary divider 226, which steer enablement alternately to either of NAND gates 231 or 232 to thereby alternately enable power switch 16 or 20 during subsequent operating cycles. During the particular operating cycle illustrated in FIG. 4, the Q input of binary divider 226 on conductor 227 is at a logic low level, as illustrated by waveform 427, and therefore the Q bar output on conductor 229 is at a logic high level (not illustrated in FIG. 4), whereby NAND gate 231 is disabled and NAND gate 232 is enabled.

As mentioned, shut-down signal 350 of FIG. 3b, which is generated by comparator 46 (FIG. 1), is applied over conductor 50 to third input terminals of NAND gates 231 and 232. Shut-down signal 350 only assumes the logic low condition (352 of FIG. 3b) to command turn-OFF of switches 16, 20 when the output voltage on conductor 42 is higher than the design value, or when a short-circuit or excessive current occurs. At time T0 of the beginning of each recurrent cycle T0–T0 of power supply operation, the shut-down signal will ordinarily be at a logic high level, representing an output voltage which is lower than desired. The logic high level of the shut-down signal when applied to inputs of NAND gates 231 and 232 enables them. Thus, in each interval T0–360 both NAND gates 231, 232 will usually be enabled at its third input terminals by the shutdown signal, and one or the other will be enabled at its second input terminals by the output signal of binary divider 226. The third and final enablement required to cause one or the other of NAND gates 231 or 232 (as selected by binary divider 226) to produce a logic low output signal occurs when the Q output of JK FF 222 goes to a logic high level at recurrent times T360. At time T360, therefore, one or the other of NAND gates 231 or 232 is fully enabled and produces a logic low level output signal to turn ON its associated switch 16 or 20, respectively. As illustrated by waveform 318 of FIG. 4g the output of NAND gate 231 remains at a logic high level at time T360, thereby leaving switch 16 (FIG. 1) in a nonconductive condition. Waveform 322 of FIG. 4h illustrates a high-to-low transition at time T360, representing a command on conductor 22 to switch 20 (FIG. 1) to assure a conductive condition.

As so far described, switches 16 and 20 are alternately enabled by the signal supplied over conductors 18 and 22 from gates 231 at 232, respectively. A width modulation of the conduction period of each of the switches is provided by the transition from a logic high to a logic low level of the shut-down signal applied over conductor 50 to inputs of gates 231 and 232, and to the reset input of FF 222. If the shut-down signal were to be applied only to FF 222, NAND gates 231 on 232 would not receive the shut-down signal until after the propagation delay of FF 222. Direct application of the shutdown signal to inputs of NAND gates 231 and 232 provides an immediate turn-OFF instruction to both power switches 16 and 20, although only that one of switches 16 and 20 which happens to be conducting responds to the turn-OFF command. The negative-going shut-down transition on conductor 50 also resets FF 222 so that its Q output goes to a logic low level, thereby guaranteeing that the power switches remain off until the next cycle of operation begins at time T0.

FIG. 5 illustrates voltage waveforms occurring in the arrangement of FIGS. 1 and 2 over a complete operating cycle during normal operation. Waveforms of FIG. 5 corresponding to those of FIGS. 3 and 4 are designated by the same reference numerals. Sync waveforms 312 of FIG. 5a corresponds to that of FIGS. 3a and 4a, and waveforms 420, 400 and 424 of FIGS. 5b, c and d correspond to those of FIGS. 4b, c and d, respectively, and are explained above. Voltage waveform 580 of FIG. 5e represents the 180 nS delayed output from delay line 214 (FIG. 2) on conductor 180, which is the feedback signal which causes NAND gate 212 to oscillate. Shut-down waveform 350 of FIG. 5f corresponds to that of FIG. 3b. As illustrated in FIG. 5f, the leading edge of negative-going portion 352 of waveform 350 advances in time relative to T0, occurring at time T3000 during the first complete cycle, at time T2000 during the second complete cycle, and at time T1000 during the last, incomplete cycle illustrated. The advancing time of shut-down may correspond to a decreasing load (increasing load resistance) which draws less current from integrating capacitor 36 (FIG. 1) so that the capacitor charges faster, or the advancing times may correspond to a higher raw DC voltage, which allows more capacitor charging current to flow through finite resistances.

Waveform 427 of FIG. 5h corresponds to that of FIG. 4f, and represents the voltage at the Q output terminal of binary divider 226 (FIG. 2). Waveform 527 of FIG. 5i is its inverse, corresponding to the voltage at the Q bar output of binary divider 226. Waveform 318 of FIG. 5j corresponds to that of FIG. 3c and represents the voltage applied from the output of NAND gate 231 (FIG. 2) over conductor 18 to switch 16 (FIG. 1). The logic low portions of waveform 318 occurs as a result of the conjunction of logic high levels of SHTDWN signal 350 of FIG. 5f, the Q output of FF 222, which is signal 423 of FIG. 5g, and the Q output of FF 226, which is signal 427 of FIG. 5h. Similarly, waveform 322 of FIG. 5k corresponds to that of FIG. 3d and represents the voltage applied from NAND gate 232 (FIG. 2) over conductor 22 to switch 20 (FIG. 1). The logic low portions of waveform 322 occur as a result of the conjunction of logic high levels at SHTDWN signal 350 of FIG. 5f, the Q output of FF 222 (signal 423 of FIG. 5g), and the Q bar output of FF 226 (signal 527 of FIG. 5i).

In FIGS. 5j and 5k, the logic low portions of waveforms 318 and 322 represent conduction periods of switches 16 and 20, respectively (FIG. 1). It should be noted that the conduction periods as illustrated alternate, and there are no overlapping periods of conduction.

Other embodiments of the invention will be apparent to those skilled in the art. For example, waveform 312 of FIGS. 3a and 4a may have a greater duration than that illustrated without any effect on the operation. The conjunction gates may include further input terminals adapted for coupling to an inhibit input signal. If negative logic were to be used instead of positive logic as described, the NAND gates described could be replaced by NOR gates.

What is claimed is:

1. A pulse width modulator for a switching power supply intended for operation at a recurrence rate, which power supply includes first and second controllable switches, each including a control input terminal, and adapted to be coupled to a source of power and to a transformer including a primary winding and a secondary winding, said pulse width modulator controlling said controllable switches for applying pulses of power to said primary winding of said transformer for generating a direct output voltage, said pulse width modulator comprising:

a first conjunction gate including an output terminal adapted to be coupled to said control input terminal of said first controllable switch and also including first, second and third input terminals;

a second conjunction gate including an output terminal adapted to be coupled to said control input terminal of said second controllable switch and also including first, second and third input terminals;

a binary divider including an input terminal and first and second mutually antiphase output terminals, said first output terminal of said binary divider being coupled to said first input terminal of said first conjunction gate, and said second output terminal of said binary divider being coupled to said first input terminal of said second conjunction gate for alternately assuming first and second operating states for alternately enabling said first input terminals of said first and second conjunction gates;

a controllable flip-flop including J, K, clock and reset input terminals, and also including an output terminal coupled to said input terminal of said binary divider and also coupled to said second input terminals of said first and second conjunction gates, said controllable flip-flop assuming a first operating state in response to a transition of a first polarity at its clock input terminal when said J input terminal is at a first of two logic levels and its K input terminal is at a second of said two logic levels, said flip-flop assuming a second operating state (a) in response to a transition of said first polarity at said clock input terminal when said J input terminal is at said second logic level and said K input terminal is at said first logic level, and (b) upon application of a reset signal to said reset input terminal, whereby in said second operating state of said controllable flip-flop neither of said first and second conjunction gates is enabled and in said first state of said controllable flip-flop that one of said first and second conjunction gates may be enabled which is enabled by said binary divider;

a gated oscillator including a gating input terminal adapted to be coupled for receiving a synchronizing signal for establishing a recurrence rate of said power supply and also including an undelayed output terminal coupled to said clock input terminal of said controllable flip-flop and also including mutually antiphase first and second delayed output terminals, said first delayed output terminal being coupled to said J input terminal of said controllable flip-flop, and said second delayed output terminal being coupled to said K input terminal of said controllable flip-flop, said oscillator operating at a frequency such that at least one and one-half complete operating cycles occur during each gating interval of said synchronizing signal, for producing a first operating state preceded by a first transition of said first polarity at said undelayed output terminal and a second operating state preceded by a second transition of a second polarity at said undelayed output terminal during each complete cycle, said first delayed output terminal being at said second logic level and said second delayed output terminal being at said first logic level after said first transition of each gating interval at said undelayed output terminal, which causes said controllable flip-flop to assume said second operating state for disabling both said first and second conjunction gates for maintaining both said first and second power switches nonconductive, and for causing said binary divider to change operating states if said controllable flip-flop changes its operating state in response to said first transition, and, in response to said second transition of said second polarity of said first cycle of said gated oscillator, changing the state of said mutually antiphase delayed output terminals, whereby said K input terminal of said controllable flip-flop assumes said second logic level and said J input terminal of said controllable flip-flop assumes said first logic level, and whereby in response to said third transition at said undelayed output terminal of said gated oscillator, said controllable flip-flop assumes said first state to thereby enable said second input terminals of said first and second conjunction gates, whereby that one of said first and second conjunction gates which also has said first input terminal enabled by said binary divider is enabled at said first and second input terminals; and;

a conductor connected to said third input terminals of said conjunction gates and to said reset input terminal of said controllable flip-flop, said reset input terminal of said controllable flip-flop being adapted to receive a shut-down signal which includes a portion at said first logic level which enables said third input terminals of said first and second conjunction gates, and which also includes a transition to said second logic level in response to at least a comparison of said output voltage of said power supply with a reference voltage for thereby both directly disabling said first and second conjunction gates and resetting said controllable flip-flop for indirectly disabling said first and second conjunction gates.

2. A modulator according to claim 1 wherein said conjunction gates comprise NAND gates.

3. A modulator according to claim 1 wherein said binary divider comprises: a source of a logic-level representative voltage; and a JK flip-flop, wherein the clock input terminal of said JK flip-flop is said input terminal of said binary divider, and said JK flip-flop further includes J and K input terminals coupled to said source of a logic-level representative voltage.

4. A modulator according to claim 3, wherein said source of a logic-level representative voltage produces a voltage representative of a logic high level.

5. A modulator according to claim 1 wherein said gated oscillator comprises:

a third conjunction gate including first and second input terminals and an output terminal, said first input terminal of said third conjunction gate corresponding to said gating input terminal of said gated oscillator, and said output terminal of said third conjunction gate corresponding to said undelayed output terminal of said gated oscillator;

a delay line including an input terminal coupled to said output terminal of said third conjunction gate, said delay line also including first and second relatively delayed output terminals, said first output terminal of said delay line being coupled to said second input terminal of said third conjunction gate to thereby define a start-stop oscillator, said second output terminal of said delay line corresponding to said second delayed output terminal of said gated oscillator; and an inverter including an input terminal coupled to said second output terminal of said delay line for inverting signal, said inverter also including an output terminal which corresponds to said first delayed output terminal of said gated oscillator.

* * * * *